United States Patent [19]

Pastien

[11] Patent Number: 4,733,877

[45] Date of Patent: Mar. 29, 1988

[54] CART APPARATUS WITH IMPROVED HANDLE

[75] Inventor: Eugene R. Pastien, Moundsview, Minn.

[73] Assignee: Smarte Carte, Inc., White Beark Lake, Minn.

[21] Appl. No.: 57,754

[22] Filed: Jun. 3, 1987

[51] Int. Cl.⁴ .............................................. B62B 3/12
[52] U.S. Cl. ............................ 280/33.99 R; 280/5.32; 280/33.99 C; 280/33.99 S; 280/47.35
[58] Field of Search ................... 280/33.99 R, 33.99 S, 280/33.99 A, 33.99 B, 33.99 C, 62, 47.34, 47.35, 5.2, 5.32, 33.99 F, 33.99 H

[56] References Cited

U.S. PATENT DOCUMENTS 3,978,959  9/1976  Muellner ............................ 194/4 R
4,381,870  5/1983  Muellner ...................... 280/33.99 B

FOREIGN PATENT DOCUMENTS 718324  9/1965  Canada ......................... 280/33.99 C

*Primary Examiner*—John J. Love
*Assistant Examiner*—Eric D. Culbreth
*Attorney, Agent, or Firm*—Merchant, Gould, Smith, Edell, Welter & Schmidt

[57] ABSTRACT

A multi-purpose luggage cart (10) is disclosed. The cart includes first and second primary support wheels (24a) and (24b) coaxially mounted to a lower frame (11) adjacent the trailing end (11a) and at oppositely disposed sides. A caster (25) is rotatable about a vertical axis (28) and is mounted to the lower frame (11) along its longitudinal axis (12) and adjacent the forward end (11b), wherein the primary support wheels (24a) and (24b) and the caster (25) movably support the lower frame and cart on a floor surface. An upper frame portion (40) includes a cross bar (43), a longitudinal bar portion (44) and a handle portion (45). A step support member (33) is cooperatively connected to the lower frame (11) proximate the forward end (11b) in order to stabilize the cart (10) and prevent movement of the cart (10) when it is positioned upon an escalator.

7 Claims, 4 Drawing Figures

CART APPARATUS WITH IMPROVED HANDLE

BACKGROUND OF THE INVENTION

1. Field of the Invention

This invention relates generally to a cart apparatus and more particularly to self-service carts of the type used to carry bulky or heavy items such as luggage or shopping bags over significant distances such as in transportation terminals or in large shopping center complexes.

2. Description of the Prior Art

The need for rugged, low-maintenance and versatile self-service carts for personalized use in large public areas is clearly evident. Modern sprawling shopping centers (such as shopping malls) and large transportation passenger terminals (such as airports or train stations) exemplify a common need for such carts, in two diverse use applications. While each such use has differing special purpose requirements (e.g. the shopping center typically requires a cart for holding a plurality of packages, while the passenger terminal requires a cart for carrying heavy and/or bulky luggage), both have many common requirements. For example, both applications often find a need for a child seat. Both require a cart that will withstand continuous day-to-day use and abuse by the public, with minimal required maintenance. Both require carts that can be readily used and accepted by the public, with minimal disruption to the business activities of the business establishment.

A number of different cart designs have been used for such applications in the past, most being special-purpose in nature. Shopping centers have typically used relatively small carts particularly intended as strollers, and offering little in the way of package carrying capability. For the most part, such strollers have, over time, become a nuisance to the business proprietors, both from maintenance and cart-distribution standpoints. Relatively few cart systems have been used successfully in transportation facilities due to a number of differing problems such as theft, unmanageability of free cart systems and cart distribution problems. With the huge traffic flow through today's busy terminals, however, the terminal baggage attendants cannot begin to handle the luggage handling needs of such establishments.

One cart system that has and is experiencing considerable success in airport terminals, and which offers the same use flexibility potential to shopping centers, is the automatic self-servicing cart vending system that provides a reward for return of the cart to strategically positioned vending islands. Such a system is described in U.S. Pat. No. 3,978,959, by the assignee hereof, and to the extent necessary is hereby incorporated by reference. In that system, the individual carts cooperatively engage with one another in a "nesting" relationship, enabling high packaging density in a relatively small vending island, thereby offering considerable space-saving and orderly cart distribution throughout a facility.

While the cart design disclosed in U.S. Pat. No. 3,978,959 for use with the vending island system has displayed considerable success in passenger terminals and shopping centers, its usage has illustrated several areas in which improvements to the cart are desirable in order to improve versatility of the cart to both the shopping center and passenger terminal applications. An example of such an improved cart is disclosed in U.S. Pat. No. 4,381,870, by the assignee hereof, and to the extent necessary is hereby incorporated by reference. The cart described in U.S. Pat. No. 4,381,870 provides for a versatile cart capable of safely carrying an adult or child. However, the loading capabilities and weight distribution of such carts make them easy to tip over. These types of conventional carts provide both an upper and lower storage surfaces, and "double stacking" on both surfaces often results in an unsafe situation. In addition, it is often difficult to load packages and luggage on the lower level of conventional carts, because the upper frame structure presents an obstruction.

Previous luggage carts have had support members attached thereto for engaging the steps of an escalator. However, these support members have been positioned on the outside of the wheels of the carts and extended from the front of the cart to the back end. With such a configuration, the cart rests at the corner of the steps and not on the steps themselves. Further, because of this design, it is necessary that the luggage cart takes on a greater angle to the horizontal when it is in position on the escalator.

The present invention addresses the problems associated with the prior art designs. The design of the present invention offers a safer and more convenient cart design.

SUMMARY OF THE INVENTION

The present invention is an improved multi-purpose luggage cart having a lower frame defining a broad support surface suitable for carrying a plurality of luggage items. The lower frame is disposed about a longitudinal axis and extends between longitudinally spaced forward and trailing ends. The cart also includes a pair of upright support members mounted to the lower frame adjacent its trailing end and at opposite sides thereof which rise generally vertically upward therefrom. An upper frame is operatively connected to the pair of upright support members. The upper frame includes a longitudinal bar portion and a handle portion, the upper frame comprising a pair of tubular members. The cart also includes first and second primary support wheels coaxially mounted to the lower frame adjacent the trailing end and at oppositely disposed sides thereof. A caster, rotatable about a vertical axis, is mounted to the lower frame along its longitudinal axis and adjacent the forward end thereof, wherein the primary support wheels and the caster movably support the lower frame and cart on a floor surface. A step support member is cooperatively connected to the lower frame proximate the forward end, in order to stabilize the cart and prevent movement of the cart when it is positioned upon an escalator.

The present invention is advantageous in that it is safer than conventional carts by preventing the likelihood of the cart overturning. The upper frame portion of the cart of the present invention is configured to prevent "double stacking" of large pieces of luggage or packages, thus preventing an undesirable weight distribution. The upper frame portion, however, provides a bar over which to drape clothing or other items, and a convenient handle for mnaneuvering the cart. The upper frame also is configured to facilitate easy loading and unloading from the lower frame's storage surface.

Another feature of the present invention is a step support which stabilizes the cart in the transverse direction. The step support also securely supports the cart when it is being tipped, as when it is positioned upon an escalator.

These and other features of the invention will become apparent from a consideration of the following specifications and accompanying drawings which form a part of this application.

DETAILED DESCRIPTION OF THE INVENTION

Figure 1:
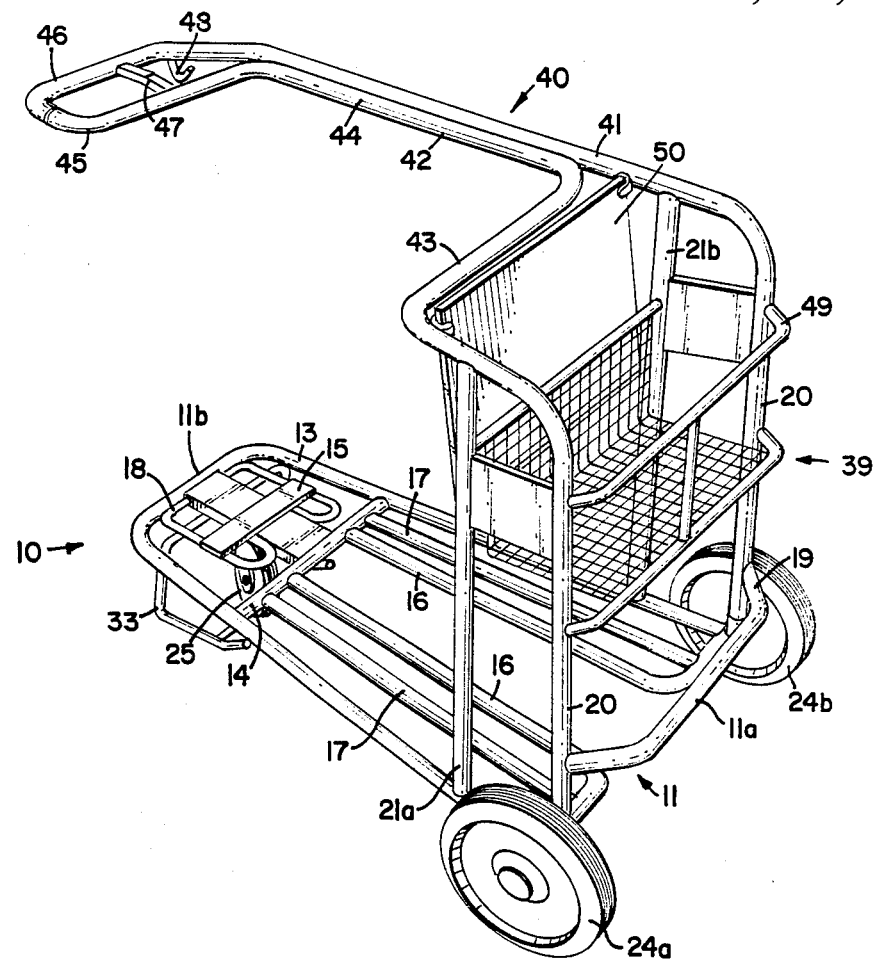
FIG. 1 is a perspective view of the cart apparatus of the present invention.
Figure 2:
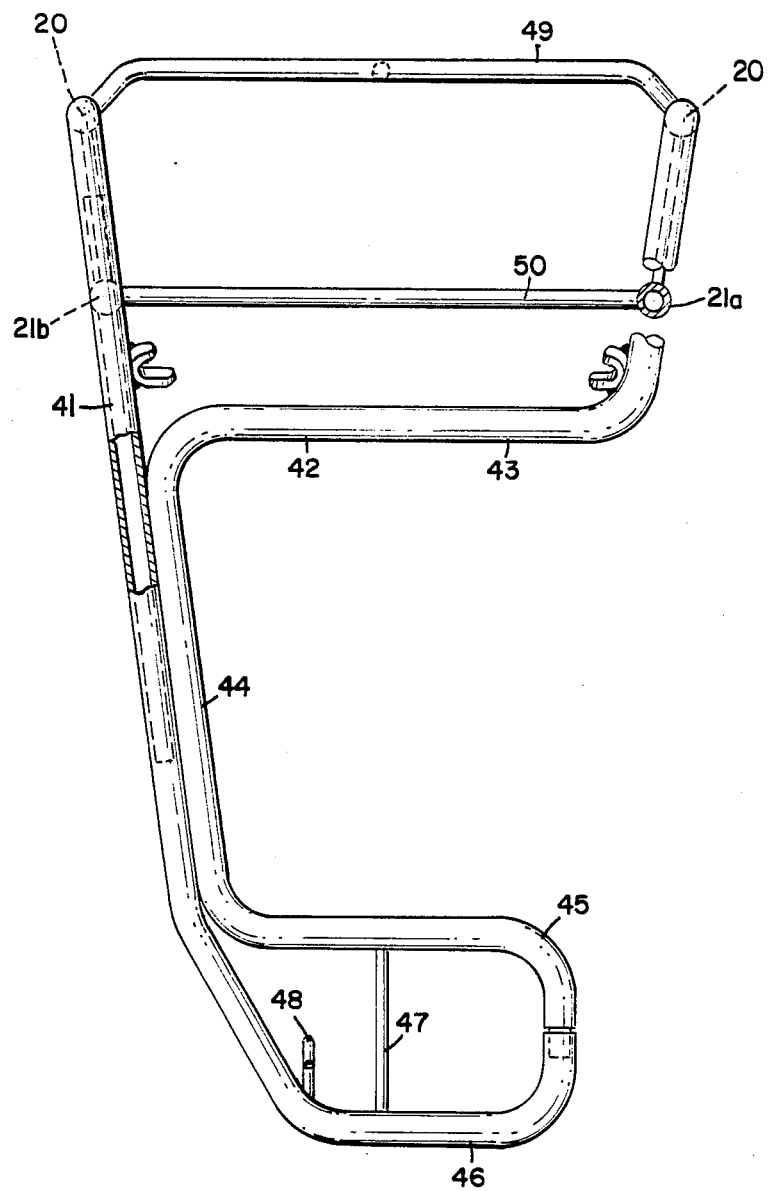
FIG. 2 is a plan view of the upper frame of the cart apparatus shown in FIG. 1.
Figure 3:
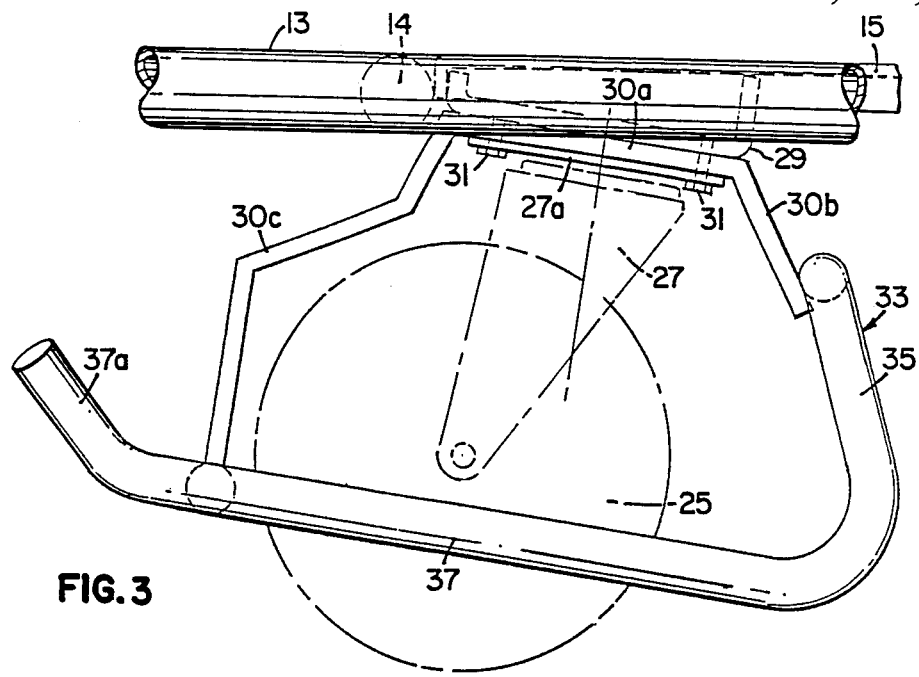
FIG. 3 is an enlarged side elevational view of the step support member shown in FIG. 1.
Figure 4:
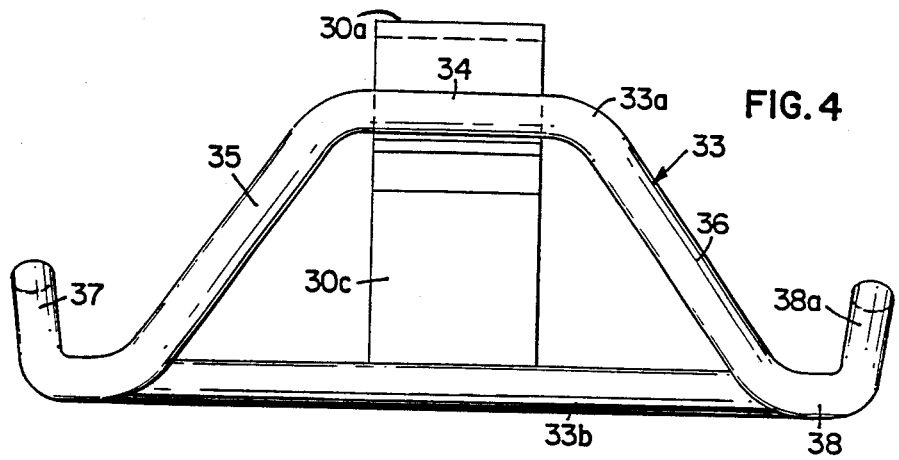
FIG. 4 is a front plan view of a portion of the cart shown in FIG. 1, showing the step support member.

Referring to the drawing, wherein like numerals represent like parts throughout the several views, there is generally disclosed at 10 a cart. The cart 10 is of the type particularly suited for use in carrying luggage or packages in passenger terminals or shopping centers, and is also applicable for use in self-service automatic vending systems of the type described in U.S. Pat. No. 3,978,959. Referring to the FIGS. 1 through 6, the cart 10 has a lower frame portion 11 generally symmetrically configured about a longitudinal axis, and extending from a first or trailing end, generally designated at 11a, and a second or forward end, generally designated at 11b. The lower frame 11 is, in the preferred embodiment, of tubular construction, and is, in the preferred embodiment, constructed of tubular steel members, as are the other tubular members of the cart, which are chrome plated for improved wear and aesthetic appearance. In the preferred embodiment, the lower frame 11 has an outer, generally U-shaped tube 13 being open at the trailing end and extending forward toward the forward end and being enclosed at the forward end. The transverse width of the outer tube 13 tapers from a generally broad width at the trailing end 11a, to a relatively narrow width at the forward end 11b, for enhancing nesting of the cart with other carts of like-configuration, as described in more detail hereinafter. A transverse brace member 14 is mounted to, and extends between the opposing legs of the U-shaped outer member 13 and is spaced relatively closer to the forward end 11b of the cart, as opposed to its distance from the trailing end 11a of the lower frame. A caster mounting member 15 is disposed between and mounted to the transverse member 14 and the front portion of the lower frame portion 11. A pair of generally L-shaped inner brace members 16 connect the trailing ends of the leg portions of the outer U-shaped portion 13 with intermediate portions of the transverse brace member 14. A pair of intermediate tubular braces 17 generally extend in a longitudinal direction of the lower frame 11 and are mounted between the pair of L-shaped brace members 16 at the trailing end 11a of the cart, and extend up to the transverse brace member 14. The respective tubular portions collectively comprising the lower frame are generally mounted in a common plane, and their respective upper surfaces collectively define a broad support surface particularly suitable for carrying items of luggage or baggage, and other bulky items.

Lower frame 11, at the forward end 11b thereof, can have a pivotally mounted retaining member 18. The retaining member 18 is disposed for pivoting between a down position, as shown in FIG. 1, and an up position. When in the up position, a retaining member 18 will prevent movement of luggage positioned on the lower frame 11 ahead of the leading edge 11b of the frame.

When the cart is not in use and it is desired to nest a number of carts together in a manner hereinafter described, retaining member 18 can be pivoted so that the retaining portion 18 thereof is aligned generally with the lower frame 11 and essentially forming an extension of the upper support surface thereof. With the retaining member 18 in this position, a foot rest 19, which is positioned at a height above the highest point of the lower frame 11, will not be obstructed by the retaining member 18 of a similar cart as two carts are nested together.

A pair of upright side support members, generally designated at 20 are mounted to the U-shaped tube 13 of the lower frame 11, adjacent the trailing end 11a thereof and rise upward therefrom in a generally vertical plane. In the preferred embodiment, each upright support member 20 includes a pair of tubular members 21a and 21b, respectively. The second tubular members 21a and 21b are also substantially upright and parallel to the member 20. The second members 21a and 21b form interconnecting braces between the lower frame member 13 and an upper, generally horizontal frame portion 40 of the cart 10.

The upper, generally horizontally disposed portion 40 of the cart 10 defines an upper frame portion of the cart. The upper horizontal frame portion 40 includes a pair of first and second tubular members 41, 42, respectively. The tubular members 41, 42 are interconnected to the vertical side support members 20. Preferably, the horizontal tubular members 41, 42 are continuous and integral with the support members 20. Near the trailing end 11a of the cart, the upper frame members 41, 42 extend up from the side support members 20 in a horizontal position, generally parallel to the longitudinal axis of the cart 10.

At a predetermined distance in front of the trailing end 11a, the second tubular member 42 curves to be generally perpendicular to the longitudinal axis of the cart 10 to form a transverse bar 43. The second tubular member 42, behind the bar 43, then runs proximate to and parallel with the first tubular member 41 for a second predetermined distance. This portion of the upper frame 40 can be identified as the longitudinal bar portion 44. The bar portion 44 can be used to fold over and drape hanging clothes and garment bags. At the forward end 11b of the upper frame portion 40, the second tubular member 42 separates from the first tubular member 41 to form a looped handle portion 45. The handle portion 45 has a transversely extending handle 46 which is wide enough to enable ease of control when steering the cart 10, as well as enabling the user to firmly grasp and hold the cart in a stable position upon an escalator. A support bar 47 can be provided for additional structural support. In addition, the preferred embodiment includes a purse hook 48 for added convenience.

The above-described configuration of the upper frame 40 prevents the user from double stacking, i.e. stacking luggage and packages on both the lower frame 11 and the upper frame 40. Such double stacking can be dangerous in that tipping and overturning of the cart is likely. In addition, the configuration of the upper frame 40 enables the user to easily stack large pieces of luggage or packages on the lower frame 13 without any unnecessary obstructions.

Suitable loops may be positioned along the upper frame 40 for hanging wearing apparel suspended from clothes hangers or for retaining items such as purses.

A suitable seat, generally designated as 39, may be suitably connected to the support members 20 and 21a and 21b. The seat 39 includes a transverse bar 49 near the trailing end 11a and a seat back 50. The seat may be of any suitable construction, such as shown in the drawings or as described in U.S. Pat. No. 4,381,870.

The cart 10 is supported for movement by wheel support means comprising a pair of primary support wheels 24a and 24b and a caster 25. The primary support wheels 24a and 24b are mounted on stub axles extensions projecting outwardly from the sides of the lower frame 11 at the trailing end 11a thereof such that the primary support wheels 24a and 24b are coaxially aligned and project outwardly from the lower frame 11. The caster 25 is mounted to the caster mounting member 15 by means of a caster mounting apparatus for rotation about a generally vertical axis. A brace member 29 is cooperatively connected to the caster mounting member 29 by suitable means such as welding. A step support mounting member 30a, 30b, 30c is cooperatively connected to the brace member 29 and a mounting bracket 27a of caster mounting apparatus 27 is cooperatively connected by means of bolts 31. The brace member 29 is provided between the caster mounting apparatus 27 and the caster mounting member 15 for orienting the caster axis 28 in a generally vertical orientation.

A step support member 33 is cooperatively connected to the lower frame proximate the caster 25. As previously described, a step support mounting member 30a, 30b, 30c is cooperatively connected to the brace 29. The mounting member 30a, 30b, 30c has a center portion 30a that is cooperatively connected to the brace 29 and a forwardly depending portion 30b and a rearwardly depending portion 30c.

The step support member 33 has a configuration which has an outer member 33a and a transverse brace member 33b. The outer member 33a is, in the preferred embodiment, construction from a single piece of material. The member 33a has a top section in the general shape of an inverted U having a top piece 34 and two downwardly depending sections 35 and 36. The top section 34 is cooperatively connected to the front 33b of the step support mounting member 30. The downwardly depending sections 35 and 36 are angled slightly outward. The member 33a also has a side member 37 which is an extension of the section 35 and another side member 38 which is an extension of section 36. The side member 37 is positioned on the left hand side of the caster 25 and the side member 36 is positioned on the right hand side of the caster 25. The side members 35 and 36 extend both in front of and behind the caster 25. The brace 33b is cooperatively connected between the two side members 37 and 38. When the cart 10 is on a level ground, the side members 37 and 38 are parallel to the ground. The side members 37 and 38 terminate at their trailing end with upwardly pointing members 37a and 38a. The step support member 33 acts to stabilize the cart 10 from tipping sideways when subject to an uneven loading or when moved on an escalator.

The embodiment of the cart just described, is particularly suitable for nesting engagement with carts of like construction. It is noted that the width or spacing between the L-shaped inner braces 16 about frame 11's longitudinal axis, is sized so as to permit unimpeded passage of a caster 25 and its support apparatus 27 as well as the step support member 33, when a second cart is nested with a first cart. The nesting function of the cart is further enhanced by the tapered construction of the upper and lower frame portions of the cart. The tapered feature enables the forward end of the trailing disposed cart to be easily placed between the pair of upright side support members 20, and act as a guide for positioning the two carts into full nesting position, with a minimal amount of force or effort required. To further assist in nesting of the carts, the lower frame portion 11 is mounted on the wheel support mechanism at an angle with respect to the lower floor surface. This angle enables the lower frame portion of a trailing disposed cart to ride above the upper surface of the lower frame portion of a forwardly disposed cart when in nesting engagement. The acute angle can range from preferably 5° to 15°, and more preferably between 5° and 9°. In the preferred embodiment of the invention, the acute angle is approximately 7.0.

The size of the primary support wheels 24a and 24b, as well as the size of the caster wheel 25 can vary depending upon the particular application to which the cart is to be put. The diameter of the primary support wheel can preferably vary from 4" to 12" and more particularly between 6" and 10". In a preferred embodiment a diameter of 8" for the primary support wheel has been found to work particularly well. The diameter dimension of the wheel portion of the caster 25 can similarly vary, and preferably will be between 2½" and 7½". In a preferred embodiment of the invention disclosed, a caster diameter of approximately 5" has been found to operate satisfactorily. The configuration of the cart and the step support member 33 make the cart particularly suitable for use on escalators, in an upright stable manner, wherein movement relative to the escalator stairs is precluded by the step support member.

When pushed onto an up escalator or pulled onto a down escalator so the trailing end 11a is higher than the forward end 11b, the wheels 24a and 24b are placed on the first step of the escalator. Then, as the step begins to rise, the cart 10 tilts back slightly and the rear wheels 24a and 24b are raised off the ground and the cart is supported by the step support member 33. The cart rests on the step support member 33 adjacent the forward end where side members 37 and 38 meet the top sections 35 and 36. The step support member 33 supports the cart 10 on both sides of the caster 25.

When pushed onto a down escalator or pulled onto an up escalator so that the trailing end 11a is lower than the forward end 11b, the cart 10 is supported in position by the rear wheels 24a and 24b and the step support member 33. In this instance, that portion of the step member 33 that is behind the caster 25 supports the cart 10 and prevents relative movement between the cart and the escalator. The cart is held in position without the rolling motion of the wheels moving the cart possibly on to the next step. In this position, the cart is also held in position on both sides of the caster wheel 25 by the side members 37 and 38 of the step support member 33 proximate the upwardly pointing members 37a and 38a respectively.

The wedge shape configuration of the step support member 33 allows for nesting of multiple carts 10 without the step support members interfering with the nesting operation.

Other modifications of the invention will be apparent to those skilled in the art in light of the foregoing description. This description is intended to provide specific examples of individual embodiments which clearly disclose the present invention. Accordingly, the invention is not limited to these embodiments or to the use of elements having specific configurations and shapes as presented herein. All alternative modifications and variations of the present invention which follows in the spirit and broad scope of the appended claims are included.

What is claimed is:

1. An improved multipurpose luggage cart having a lower frame defining a broad support surface suitable for carrying a plurality of luggage items, the lower frame being disposed about a longitudinal axis and extending between longitudinally spaced froward and trailing ends, comprising:
   (a) first and second primary support wheels coaxially mounted to said lower frame adjacent said trailing end and at oppositely disposed sides thereof;
   (b) a caster, rotatable about a vertical axis, mounted to the lower frame along its longitudinal axis and adjacent the forward end thereof, wherein said primary support wheels and said caster movably support the lower frame and cart on a floor surface;
   (c) a pair of upright spaced-apart support members mounted to said lower frame adjacent its trailing end and rising generally vertically upward therefrom; and
   (d) an upper frame comprising first and second frame members, said first member extending over said lower frame in a direction parallel to said longitudinal axis, said second member being configured to include a portion proximate said trailing end spaced apart from said first member, an intermediate portion proximate to and parallel with said first member, and a handle portion proximate said forward end.

2. The cart of claim 1, further comprising a step support member cooperatively connected to said lower frame proximate said forward end, wherein said support member prevents tipping of said cart.

3. The cart of claim 2, wherein said step support member extends on both sides of said caster and also extends in front of and behind said caster.

4. The cart of claim 3, wherein said step support member is generally wedge shaped along its bottom horizontal surface to assist in nesting of a plurality of the carts.

5. The cart of claim 1, wherein said first and second upper frame members are integral with said pair of upright support members.

6. The cart of claim 5, wherein said first and second upper frame members comprise a continuous tubular member.

7. An improved multipurpose luggage cart having a lower frame defining a broad support surface suitable for carrying a plurality of luggage items, the lower frame being disposed about a longitudinal axis and extending between longitudinally spaced forward and trailing ends, comprising:
   (a) first and second primary support wheels coaxially mounted to the lower frame adjacent the trailing end and at oppositely disposed sides thereof;
   (b) a caster, rotatable about a vertical axis, mounted to the lower frame along its longitudinal axis and adjacent the forward end thereof, wherein said primary support wheels and said caster movably supports the lower frame and cart on a floor surface;
   (c) a pair of upright spaced-apart support members mounted to said lower frame adjacent its trailing end and rising generally vertically upward therefrom;
   (d) an upper frame comprising a first and second tubular member, said first member extending over said lower frame in a direction parallel to said longitudinal axis, said second member being configured to include a portion proximate said trailing end spaced apart from said first member, an intermediate portion proximate to and parallel with said first member, and a handle portion proximate said forward end, wherein said first and second upper frame members are integral with said pair of upright support members; and
   (e) a step support member in a generally wedge shape along its bottom horizontal surface cooperatively connected to said lower frame proximate said forward end and extending on both sides of said caster and also extending in front of and behind said caster, wherein said support member prevents tipping of said cart.

* * * * *